United States Patent
Fujiwara et al.

(10) Patent No.: US 12,074,522 B2
(45) Date of Patent: Aug. 27, 2024

(54) POWER CONVERSION DEVICE WITH PARALLEL DC-DC COVERTERS AND MULTIPLE DRIVING MODES

(71) Applicant: Mitsubishi Electric Corporation, Tokyo (JP)

(72) Inventors: Kenji Fujiwara, Tokyo (JP); Akihiko Iwata, Tokyo (JP); Hisatoshi Fukumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 47 days.

(21) Appl. No.: 17/785,913

(22) PCT Filed: Jan. 28, 2020

(86) PCT No.: PCT/JP2020/002916
§ 371 (c)(1),
(2) Date: Jun. 16, 2022

(87) PCT Pub. No.: WO2021/152688
PCT Pub. Date: Aug. 5, 2021

(65) Prior Publication Data
US 2023/0361680 A1    Nov. 9, 2023

(51) Int. Cl.
*H02M 3/158*    (2006.01)
*H02M 1/088*    (2006.01)
*H02M 1/14*    (2006.01)

(52) U.S. Cl.
CPC ......... *H02M 3/1584* (2013.01); *H02M 1/088* (2013.01); *H02M 1/14* (2013.01)

(58) Field of Classification Search
CPC .......... H02M 1/14; H02M 1/084; H02M 1/00; H02M 3/155–1588; H02M 5/2573;
(Continued)

(56) References Cited

U.S. PATENT DOCUMENTS 6,600,296 B2 * 7/2003 Hazucha ................ H02M 3/07
323/237
7,615,982 B1 * 11/2009 Guo .................... H02M 3/1584
323/286
(Continued)

FOREIGN PATENT DOCUMENTS

EP    3086455 A2    10/2016
JP    61-92162 A    5/1986
(Continued)

OTHER PUBLICATIONS

Extended European search report issued on Jan. 2, 2023, in corresponding European patent Application No. 20916367.4, 10 pages.
(Continued)

*Primary Examiner* — Thienvu V Tran
*Assistant Examiner* — Nusrat Quddus
(74) *Attorney, Agent, or Firm* — XSENSUS LLP

(57) ABSTRACT

For connected-in-parallel N DC-DC converters (1 to N, where N is 3 or more), a first converter group on which PWM switching is performed with a first carrier, and a second converter group on which PWM switching is performed with a second carrier having a phase different from that of the first carrier, are provided. One or more of the DC-DC converters (1 to N) are assigned to each converter group. A plurality of drive modes in which the number of the DC-DC converters that are driven and the converter groups are set, are provided. The drive modes are switched through comparison between a preset threshold value and a total output of the N DC-DC converters (1 to N), and a ratio between total outputs in the first and second converter groups is set to fall within a predetermined range.

16 Claims, 13 Drawing Sheets

(58) Field of Classification Search

CPC ........ H02M 1/081; H02M 5/293; H02M 7/12; H02M 3/10; H02M 3/125; H02M 3/13; H02M 3/135; H02M 3/145; H02M 3/15; H02M 3/156; H02M 3/158; H02M 2003/1566; H02M 3/1582; H02M 2003/1557; H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 7/519; H02M 7/521; H02M 7/523; H02M 7/75; H02M 7/757; H02M 7/7575; H02M 7/66; H02M 7/68; H02M 7/72; H02M 7/483; H02M 2007/4835; H02M 7/487; H02M 1/08; H02M 1/0845; H02M 7/515; H02M 7/525; H02M 7/527; H02M 7/529; H02M 7/539; H02M 1/32; H02M 2001/322; H02M 2001/327; H02M 1/34; H02M 2001/342; H02M 2001/344; H02M 2001/346; H02M 2001/348; H02M 1/36; H02M 1/38; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | | | |
|---|---|---|---|---|
| 8,179,116 B2* | 5/2012 | Wei | ............ | H02M 3/156 323/224 |
| 8,963,521 B2* | 2/2015 | Wei | ............ | H02M 3/1584 323/272 |
| 9,837,906 B1* | 12/2017 | Childs | ............ | H02M 3/1584 |
| 9,906,128 B2* | 2/2018 | Tschirhart | ............ | H02M 3/00 |
| 10,090,765 B1* | 10/2018 | Kanzian | ............ | H02M 3/1588 |
| 2004/0120169 A1* | 6/2004 | Schrom | ............ | H02M 3/1584 363/65 |
| 2005/0093525 A1* | 5/2005 | Walters | ............ | H02M 3/1584 323/272 |
| 2008/0197824 A1* | 8/2008 | Qiu | ............ | H02M 3/1584 323/272 |
| 2009/0039843 A1* | 2/2009 | Kudo | ............ | H02M 3/1584 323/272 |
| 2009/0058379 A1* | 3/2009 | Sreenivas | ............ | H02M 3/1588 323/241 |
| 2011/0254526 A1* | 10/2011 | Luo | ............ | H02M 3/1584 323/284 |
| 2013/0051100 A1* | 2/2013 | Daigo | ............ | H02J 7/14 363/124 |
| 2016/0308440 A1* | 10/2016 | Yan | ............ | H02M 3/158 |
| 2018/0138815 A1 | 5/2018 | Yamada et al. | | |
| 2018/0145594 A1* | 5/2018 | Akre | ............ | H02M 3/1584 |
| 2021/0028705 A1* | 1/2021 | Ishikura | ............ | H02M 3/1584 |
| 2022/0321016 A1* | 10/2022 | Khaligh | ............ | H02M 3/33561 |
| 2023/0040660 A1* | 2/2023 | Slepchenkov | .... | H02M 3/33561 |
| 2023/0194625 A1* | 6/2023 | Zafarana | ............ | H02M 1/0064 324/764.01 |
| 2023/0396154 A1* | 12/2023 | Yamaguchi | ............ | H02M 3/158 |
| 2024/0063720 A1* | 2/2024 | Yang | ............ | H02M 1/088 |

FOREIGN PATENT DOCUMENTS

| | | |
|---|---|---|
| JP | 7-264776 A | 10/1995 |
| JP | 2008-22628 A | 1/2008 |
| JP | 2012-210013 A | 10/2012 |
| JP | 2018-82532 A | 5/2018 |

OTHER PUBLICATIONS

Zipan Nie et al., "Multi-phase VSI DC-link capacitor considerations", IET Electric Power Applications, IET, UK, vol. 13, No. 11, Apr. 29, 2019, pp. 1804-1811, ISSN:1751-8660, DOI:10.1049/IET-EPA.2019.0062, XP006101191.

Infineon Technologies AG, "Dual-phase operation in multiphase buck applications", AN_2005_PL12_2006_164920, Application Note, Jul. 10, 2020, V1.0, total 20 pages, XP093006384.

International Search Report and Written Opinion mailed on Mar. 24, 2020, received for PCT Application PCT/JP2020/002916, filed on Jan. 28, 2020, 8 pages including English Translation.

European Office Action issued Apr. 9, 2024 in corresponding European Patent Application No. 20 916 367.4 (8 pages).

* cited by examiner

FIG. 10

|  | FIRST DRIVE MODE | SECOND DRIVE MODE | THIRD DRIVE MODE |
|---|---|---|---|
| FIRST DC-DC CONVERTER | FIRST CONVERTER GROUP | FIRST CONVERTER GROUP | SECOND CONVERTER GROUP |
| SECOND DC-DC CONVERTER | SECOND CONVERTER GROUP | FIRST CONVERTER GROUP | FIRST CONVERTER GROUP |
| THIRD DC-DC CONVERTER | STOPPED | SECOND CONVERTER GROUP | FIRST CONVERTER GROUP |
| FOURTH DC-DC CONVERTER | STOPPED | STOPPED | SECOND CONVERTER GROUP |
| FIFTH DC-DC CONVERTER | STOPPED | STOPPED | STOPPED |
| SIXTH DC-DC CONVERTER | STOPPED | STOPPED | STOPPED |
| SEVENTH DC-DC CONVERTER | STOPPED | STOPPED | STOPPED |
| POWER PROPORTION OF FIRST CONVERTER GROUP | 1 | 3 | 5 |
| POWER PROPORTION OF SECOND CONVERTER GROUP | 2 | 3 | 5 |

FIG. 11

|  | FOURTH DRIVE MODE | FIFTH DRIVE MODE | SIXTH DRIVE MODE |
|---|---|---|---|
| FIRST DC-DC CONVERTER | SECOND CONVERTER GROUP | FIRST CONVERTER GROUP | FIRST CONVERTER GROUP |
| SECOND DC-DC CONVERTER | SECOND CONVERTER GROUP | SECOND CONVERTER GROUP | FIRST CONVERTER GROUP |
| THIRD DC-DC CONVERTER | FIRST CONVERTER GROUP | SECOND CONVERTER GROUP | SECOND CONVERTER GROUP |
| FOURTH DC-DC CONVERTER | FIRST CONVERTER GROUP | FIRST CONVERTER GROUP | SECOND CONVERTER GROUP |
| FIFTH DC-DC CONVERTER | SECOND CONVERTER GROUP | FIRST CONVERTER GROUP | FIRST CONVERTER GROUP |
| SIXTH DC-DC CONVERTER | STOPPED | SECOND CONVERTER GROUP | FIRST CONVERTER GROUP |
| SEVENTH DC-DC CONVERTER | STOPPED | STOPPED | SECOND CONVERTER GROUP |
| POWER PROPORTION OF FIRST CONVERTER GROUP | 7 | 11 | 14 |
| POWER PROPORTION OF SECOND CONVERTER GROUP | 8 | 10 | 14 |

FIG. 12

| | THIRD DRIVE MODE (ALL DC-DC CONVERTERS ARE NORMAL) | | THIRD DRIVE MODE (ONE DC-DC CONVERTERS HAS FAILED) | |
|---|---|---|---|---|
| | DRIVE SERIAL NUMBER | OPERATION STATE | DRIVE SERIAL NUMBER | OPERATION STATE |
| FIRST DC-DC CONVERTER | 1 | SECOND CONVERTER GROUP | 1 | SECOND CONVERTER GROUP |
| SECOND DC-DC CONVERTER | 2 | FIRST CONVERTER GROUP | 2 | FIRST CONVERTER GROUP |
| THIRD DC-DC CONVERTER | 3 | FIRST CONVERTER GROUP | — | FAILED |
| FOURTH DC-DC CONVERTER | 4 | SECOND CONVERTER GROUP | 3 | FIRST CONVERTER GROUP |
| FIFTH DC-DC CONVERTER | 5 | STOPPED | 4 | SECOND CONVERTER GROUP |
| SIXTH DC-DC CONVERTER | 6 | STOPPED | 5 | STOPPED |
| SEVENTH DC-DC CONVERTER | 7 | STOPPED | 6 | STOPPED |

# POWER CONVERSION DEVICE WITH PARALLEL DC-DC COVERTERS AND MULTIPLE DRIVING MODES

CROSS-REFERENCE TO RELATED APPLICATION

The present application is based on PCT filing PCT/JP2020/002916, filed Jan. 28, 2020, the entire contents of which are incorporated herein by reference.

TECHNICAL FIELD

The present disclosure relates to a power conversion device.

BACKGROUND ART

In recent years, motorization systems that make a change from an engine-driven type to a motor-driven type have been progressively spread in electric automobiles, ships, and the like. Furthermore, regarding aircrafts as well, research for motorization has been progressing in countries all over the world in view of a trend of reducing carbon dioxide.

In order to achieve efficiency increase of a motorization system, efficiency increase, size reduction, and weight reduction have been required for a DC-DC converter that connects a battery and a direct current (DC) link of an inverter to each other.

As a technology for efficiency increase and size reduction of a DC-DC converter, multilevel chopper circuits are disclosed as valid systems (for example, Patent Document 1). In addition, a technology in which the number of devices that are driven is changed so as to obtain an optimum power conversion efficiency, is disclosed (for example, Patent Document 2).

CITATION LIST

Patent Document

Patent Document 1: Japanese Laid-Open Patent Publication No. 61-92162
Patent Document 2: Japanese Laid-Open Patent Publication No. 2012-210013

SUMMARY OF THE INVENTION

Problems to be Solved by the Invention

Each multilevel chopper in Patent Document 1 optimizes a reactor by 2-fold boosting. A conduction ratio is 50% when two of the multilevel choppers perform drive operations in parallel. By inverting output phases of the two chopper circuits by 180 degrees, output combined current can be smoothed, and high-frequency current can be made low. However, if the technology of Patent Document 2 in which the number of devices that are driven is changed, is used for the multilevel choppers, an odd number of devices cannot be taken into account.

The present disclosure has been made to solve the above problem, and an object of the present disclosure is to provide a power conversion device in which optimization of power conversion efficiency and ripple reduction of output current can be realized regardless of the number of DC-DC converters that are driven in parallel.

Solution to the Problems

A power conversion device according to the present disclosure includes N DC-DC converters connected in parallel, the DC-DC converters having an input side connected to a DC source and having an output side connected to a load, where N is 3 or more; and a control device configured to control the DC-DC converters. Each of the N DC-DC converters belongs to either of a first converter group on which PWM switching control is performed by using a first carrier, and a second converter group on which PWM switching control is performed by using a second carrier having a phase that differs from a phase of the first carrier. At least one of the DC-DC converters is assigned to each of the first converter group and the second converter group. The control device determines a plurality of drive modes in each of which the number of the DC-DC converters that are driven and the converter groups are set, the control device switching the drive modes through comparison between a preset threshold value and a total output of the N DC-DC converters, the control device setting a ratio between a total output in the first converter group and a total output in the second converter group to fall within a predetermined range.

Effect of the Invention

In the power conversion device according to the present disclosure, optimization of power conversion efficiency and ripple reduction of output current can be realized regardless of the number of DC-DC converters that are driven in parallel.

BRIEF DESCRIPTION OF THE DRAWINGS

FIG. 10 is a diagram for explaining drive modes and converter group states of seven DC-DC converters in the power conversion device according to embodiment 3.
FIG. 11 is a diagram for explaining drive modes and converter group states of the seven DC-DC converters in the power conversion device according to embodiment 3.

FIG. 12 is a diagram for explaining a drive mode and converter group states of the DC-DC converters at the time of a failure in a power conversion device according to embodiment 4.

DESCRIPTION OF EMBODIMENTS

Embodiment 1

Figure 1:
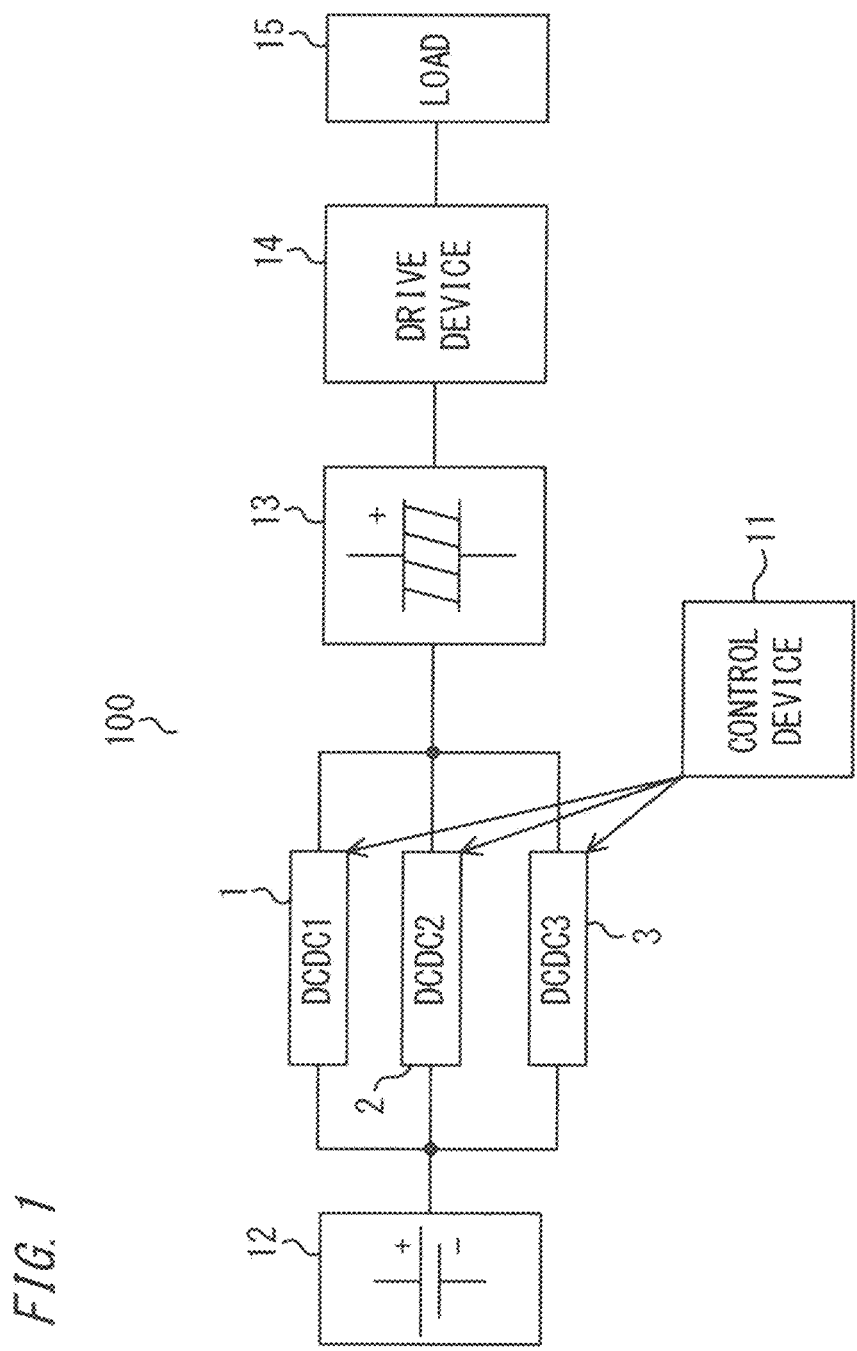
FIG. 1 is a configuration diagram of a power conversion device according to embodiment 1.

Embodiment 1 is related to a power conversion device. The power conversion device includes three DC-DC converters connected in parallel, and a control device for controlling the DC-DC converters. The power conversion device further includes a first converter group on which PWM switching control is performed by using a first carrier, and a second converter group on which PWM switching control is performed by using a second carrier having a phase that differs from a phase of the first carrier. One or more of the DC-DC converters are assigned to each converter group. A plurality of drive modes in each of which the number of the DC-DC converters that are driven and the converter groups are set, are provided. The control device switches the drive modes through comparison between a preset threshold value and a total output of the three DC-DC converters, the control device setting a ratio between a total output in the first converter group and a total output in the second converter group to fall within a predetermined range.

Hereinafter, a configuration and an operation of the power conversion device according to embodiment 1 will be described with reference to FIG. 1 which is a configuration diagram of the power conversion device, FIG. 2 which is a circuit diagram of non-insulated boost choppers in the case where a plurality of the non-insulated boost choppers are in parallel, FIG. 3 which is a circuit diagram of a multilevel chopper, FIG. 4 which is a diagram for explaining boost ratio and high-frequency ripple current that flows in a reactor of the multilevel chopper, FIG. 5 which is a diagram for explaining drive modes and outputs of the three DC-DC converters, and FIG. 6 which is a configuration diagram of an example in which a plurality of parallel DC-DC converters are mounted to an aircraft.

The overall configuration of a power conversion device 100 according to embodiment 1 will be described with reference to FIG. 1.

With the three DC-DC converters connected in parallel (a first DC-DC converter 1, a second DC-DC converter 2, and a third DC-DC converter 3) being at the center of the power conversion device 100, the power conversion device 100 includes a first battery 12 as a DC source connected to an input side of the first to third DC-DC converters 1 to 3; a first capacitor 13, for a DC link, which is connected to an output side of the first to third DC-DC converters 1 to 3; and a load drive device 14 for supplying a predetermined level of power to a load 15 with the first capacitor 13 being set to a DC busbar. The power conversion device 100 further includes a control device 11 which controls the first to third DC-DC converters 1 to 3 to perform a predetermined function of the power conversion device 100, as described later.

In FIG. 1, the first DC-DC converter 1 is described as DCDC1, the second DC-DC converter 2 is described as DCDC2, and the third DC-DC converter 3 is described as DCDC3.

Figure 2:
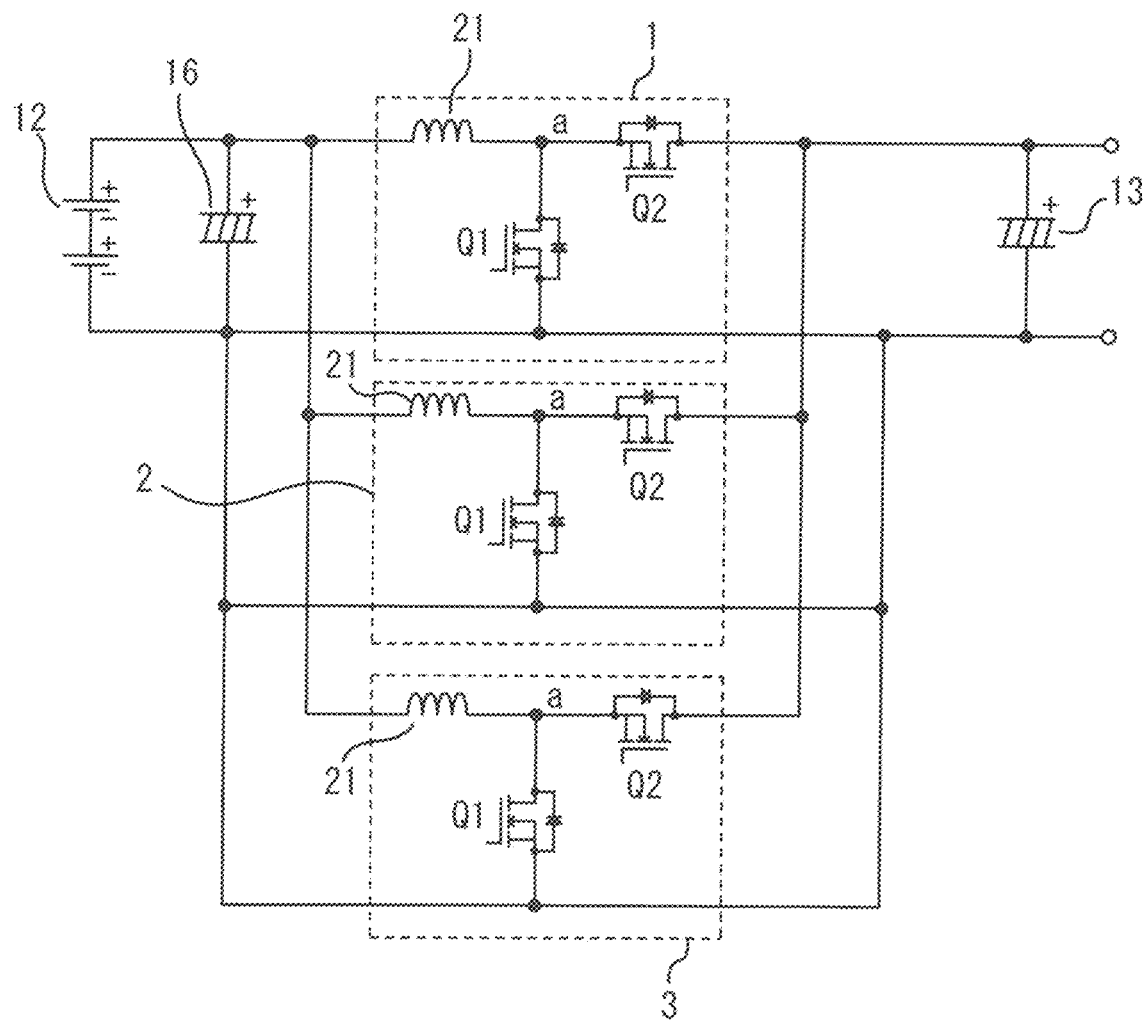
FIG. 2 is a circuit diagram of non-insulated boost choppers in the case where a plurality of the non-insulated boost choppers are in parallel, in the power conversion device according to embodiment 1.

Although not shown in FIG. 1, a DC-DC converter input capacitor 16 for smoothing is provided on the input side of the first to third DC-DC converters 1 to 3, and the DC-DC converter input capacitor 16 is connected in parallel to the first battery 12, as shown in FIG. 2.

Although the battery is used as a DC source in FIG. 1, other battery systems such as a DC power supply and a solar cell may be used.

If the load 15 is a DC load, the load drive device 14 functions as a converter circuit for converting a DC as an output from the first to third CC-DC converters 1 to 3 into another DC voltage. If the load 15 is an AC load, the load drive device 14 functions as an inverter circuit for converting a DC as an output from the first to third DC-DC converters 1 to 3 into an AC.

The first to $N^{th}$ DC-DC converters 1 to N, the number of which is ordinarily three or more, are connected in parallel between the first battery 12 as a DC source and the first capacitor 13 for a DC link. Embodiment 1 will give description about the case where three DC-DC converters are connected in parallel.

Next, a circuit configuration of the first to third DC-DC converters 1 to 3 will be described with reference to FIG. 2.

FIG. 2 is a circuit diagram in the case where three non-insulated boost choppers as the DC-DC converters are connected in parallel.

Each of the first to third DC-DC converters 1 to 3 in embodiment 1 is composed of two power semiconductor elements Q1 and Q2 and a reactor 21 which are shown in FIG. 2.

Each of the power semiconductor elements Q1 and Q2 is a self-turn-off power semiconductor element such as an insulated gate bipolar transistor (IGBT) or a metal-oxide-semiconductor field-effect transistor (MOSFET).

In embodiment 1, the case of using an MOSFET is assumed, and terminals thereof are described as a drain terminal, a source terminal, and a gate terminal.

In FIG. 2, the reactor 21 is connected between the DC-DC converter input capacitor 16 and a connection point (a between the drain terminal of the power semiconductor element Q1 and the source terminal of the power semiconductor element Q2.

Next, a configuration and a function of the control device 11 will be described.

In order to control the first to third DC-DC converters 1 to 3, the control device 11 includes, for example, a central processing unit (CPU) or a field programmable gate array (FPGA) as a computation functional element.

The control device 11 outputs gate signals for driving the power semiconductor elements Q1 and Q2 of the first to third DC-DC converters 1 to 3. Each gate signal is generated by employing a triangular wave comparison method such as pulse width modulation (PWM) control.

The control device 11 uses, as triangular wave carriers for controlling the first to third DC-Dr converters 1 to 3, a first triangular wave carrier and a second triangular wave carrier having a phase that is shifted by about 180 degrees from a phase of the first triangular wave carrier.

It is noted that the phrase "about 180 degrees" is, for example, 175 degrees or larger and 185 degrees or smaller, and preferably 179 degrees or larger and 181 degrees or smaller.

Although triangular wave carriers are used for PWM switching control in embodiment 1, carriers other than triangular wave carriers, e.g., saw-tooth-wave carriers, may be used.

The control device 11 determines, according to drive modes, whether PWM switching control using the first triangular wave carrier is to be performed on the first to third DC-DC converters 1 to 3, PWM switching control using the second triangular wave carrier is to be performed on the first to third DC-DC converters 1 to 3, or the first to third DC-DC converters 1 to 3 are to be stopped. A DC-DC converter group to be controlled by using the first triangular wave carrier is referred to as a first converter group, and a DC-DC converter group to be controlled by using the second triangular wave carrier is referred to as a second converter group.

The control device 11 causes the first to third DC-DC converters 1 to 3 to perform power conversion by performing switching operations of the power semiconductor elements Q1 and Q2 such that a DC link voltage as a voltage across the first capacitor 13 becomes about 2 times the voltage value of the first battery 12.

It is noted that the phrase "about 2 times" is, for example, 1.8 times or greater and 2.2 times or less and preferably 1.95 times or greater and 2.05 times or less.

The conduction ratio of each non-insulated boost chopper of 2-fold boosting described with FIG. 2 is 50%, and currents that are inverted between the converter groups are outputted. Thus, an output combined value of the first to third DC-DC converters 1 to 3 becomes continuous and is significantly smoothed, and high-frequency current can be suppressed.

Figure 3:
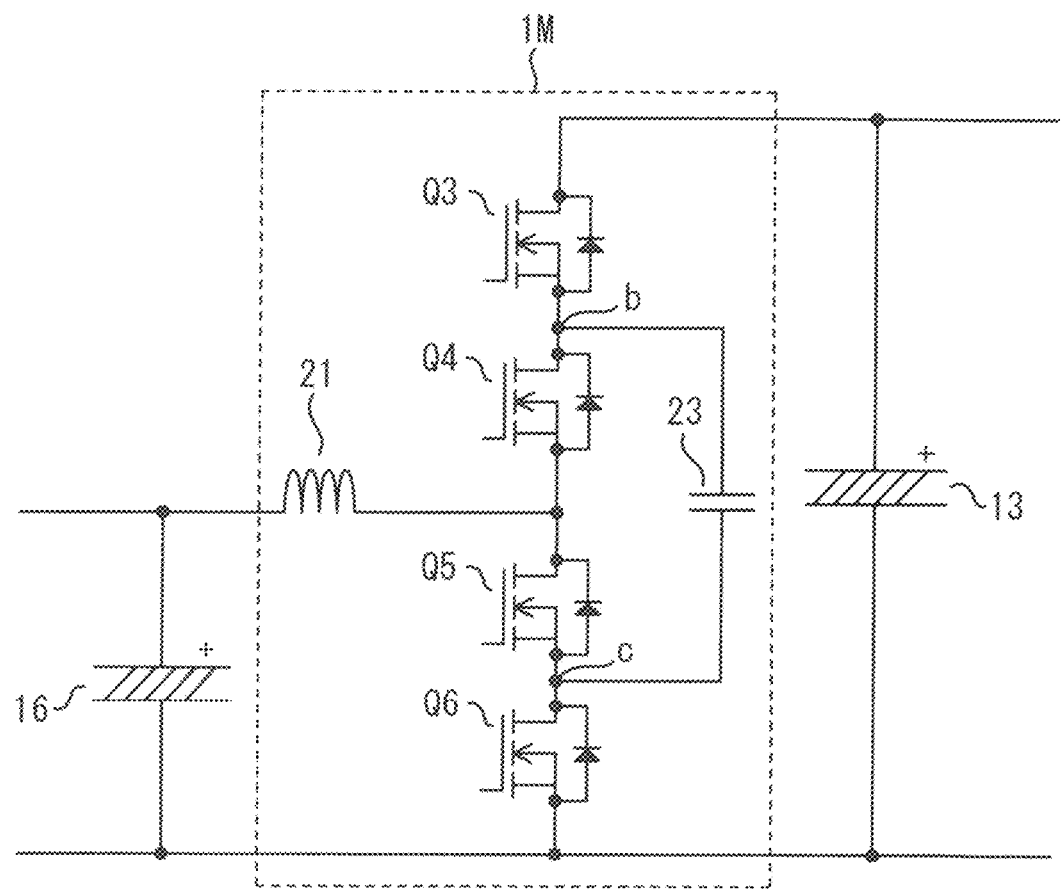
FIG. 3 is a circuit diagram of a multilevel chopper in the power conversion device according to embodiment 1.

Next, regarding the case where a multilevel chopper in FIG. 3 is used instead of the non-insulated boost chopper in FIG. 2, effects of the multilevel chopper will be described with reference to FIG. 4.

It is noted that, in FIG. 3, only a multilevel chopper 1M corresponding to the first DC-DC converter 1 will be described, and multilevel choppers corresponding to the second and third DC-DC converters 2 and 3 will not be described, in order to make the drawing easily understandable. In FIG. 3, the multilevel chopper is denoted by 1M for distinguishment from the non-insulated boost chopper in FIG. 2.

The multilevel chopper 1M is composed of four power semiconductor elements Q3, Q4, Q5, and Q6 and the reactor 21. The multilevel chopper 1M further includes a capacitor 23 which functions as a flyback capacitor, between a connection point (b) between the source of Q3 and the drain of Q4, and a connection point (c) between the source of Q5 and the drain of Q6.

Figure 4:
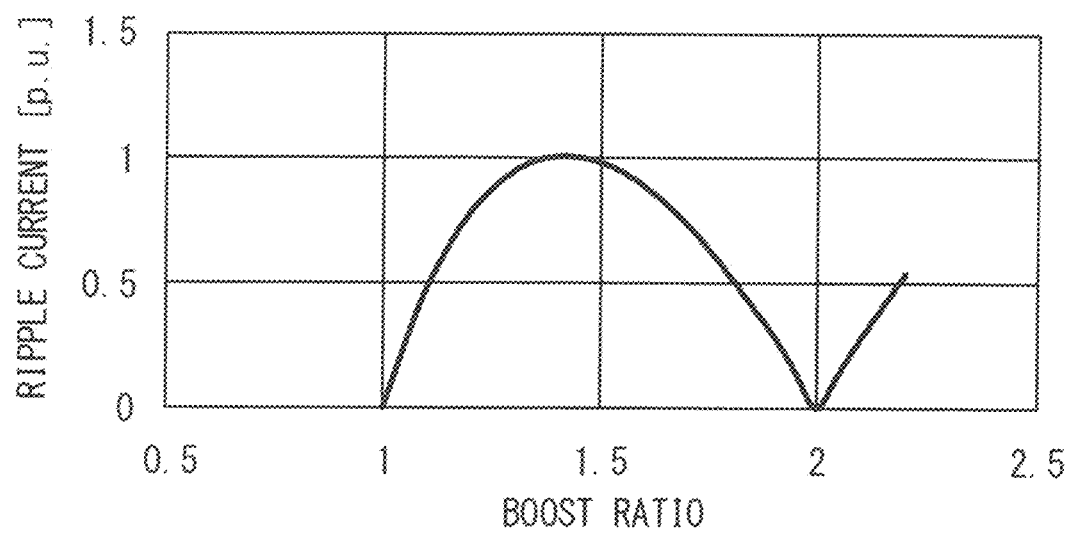
FIG. 4 is a diagram for explaining boost ratio and high-frequency ripple current that flows in a reactor of the multilevel chopper in the power conversion device according to embodiment 1.

If this multilevel chopper is applied, high-frequency ripple current that flows in the reactor 21 is significantly suppressed with a boost ratio being about 2-fold, as shown in FIG. 4. Thus, the size of the reactor 21 can be reduced.

Therefore, the multilevel chopper is a valid circuit system in an operation of performing about 2-fold boosting at a conduction ratio of 50% as in embodiment 1.

Next, an operation of the power conversion device 100 will be described with reference to FIG. 5.

Ordinarily, the first to $N^{th}$ DC-DC converters 1 to N, the number of which is three or more, are implemented by two or more types of converters that have different power rated capacities. Embodiment 1 will give description about the case where the power rated capacity of the first DC-DC converter 1 is set to 1 [p.u.], the power rated capacity of the second DC-DC converter 2 is set to 2 [p.u.], and the power rated capacity of the third DC-DC converter 3 is set to 3 [p.u.].

Figure 5:
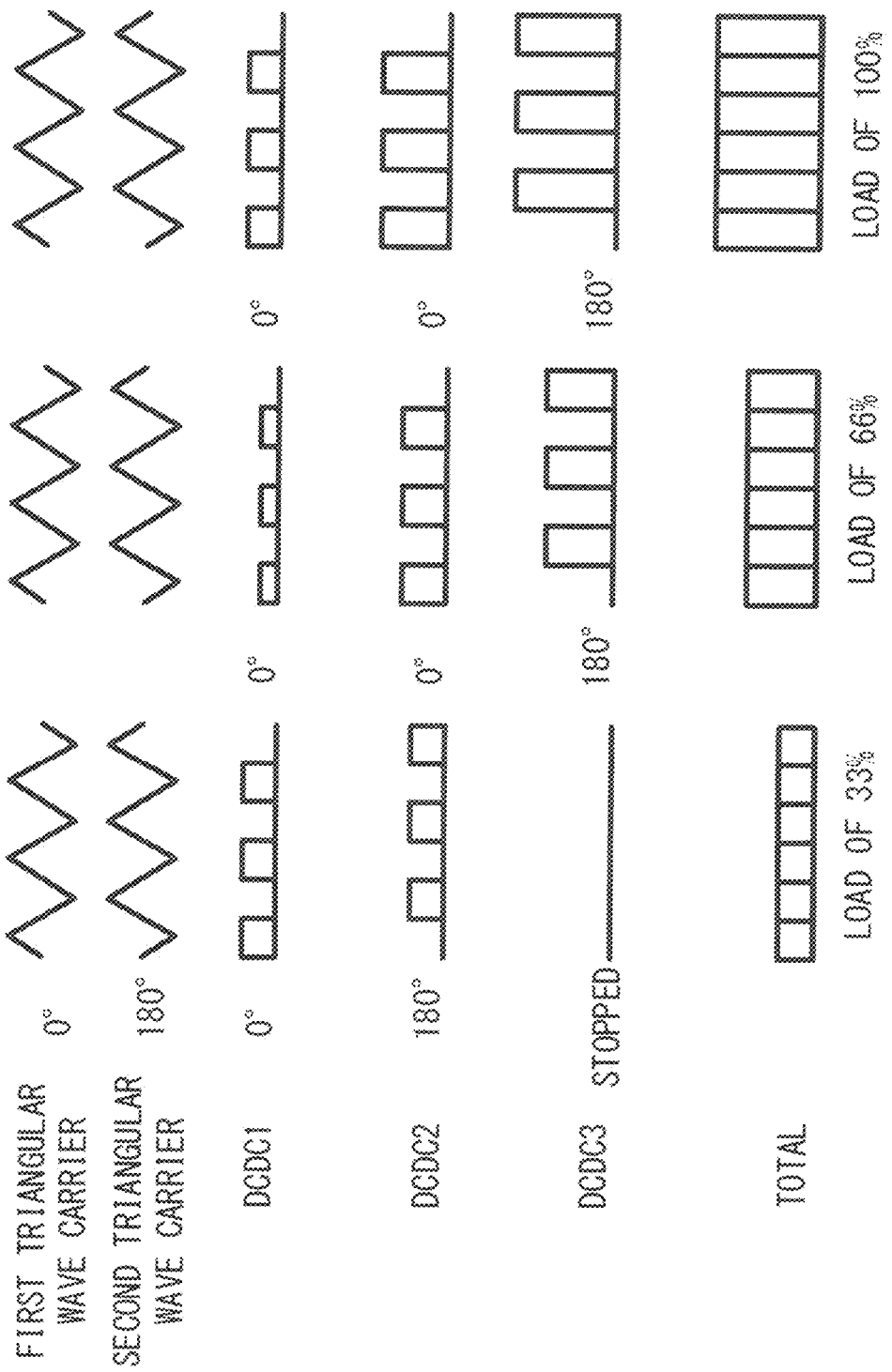
FIG. 5 is a diagram for explaining drive modes and outputs of three DC-DC converters in the power conversion device according to embodiment 1.

FIG. 5 shows the first and second triangular wave carriers, and output currents and the total output current of the first to third DC-DC converters, at each of a load of 33%, a load of 66%, and a load of 100%.

As described above, each boost chopper performs about 2-fold boosting of voltage, and thus the conduction ratio of the chopper is 50%. By causing currents equivalent to one another to flow, a combined value of the output currents flowing from the respective choppers to the first capacitor 13 for a DC link is smoothed to become a continuous DC current, and a high-frequency component is suppressed.

Firstly, an operation of the power conversion device 100 in the case where the load 15 is increased from a low-loaded state, will be described.

In a first drive mode which is set as a range in which power of the load 15 is lowest, the first DC-DC converter 1 and the second DC-DC converter 2 are operating. At this time, the third DC-DC converter 3 is stopped.

Here, output powers of the first converter group and the second converter group are approximately equal to each other. Input and output voltages are equal to each other, and thus this means that current values are equal to each other.

In FIG. 5, the state of a load of 33% corresponds to the first drive mode.

In the first drive mode, the first DC-DC converter 1 is operating while belonging to the first converter group, and the second DC-DC converter 2 is operating while belonging to the second converter group. The first DC-DC converter 1 and the second DC-DC converter 2 output the same power.

In the first drive node in embodiment 1, it is possible to output a smoothed current (such as one shown in FIG. 5) of up to 2 [p.u.] (2 times the power rated capacity of the first DC-DC converter 1) which is a load of about 33% of a full load.

If the power of the load 15 is increased and exceeds 2 [p.u.], the power capacity becomes insufficient. Consequently, transition to a second drive mode is performed. In embodiment 1, the power value of 2 [p.u.] is set as a first mode threshold value.

The first mode threshold value is set to be equal to or less than 2 times the power value of a group that has a lower total power capacity out of the first converter group and the second converter group.

In the first drive mode in embodiment 1, the power rated capacity of the first DC-DC converter 1 belonging to the first converter group is lower than the power rated capacity of the second DC-DC converter 2 belonging to the second converter group. Thus, the first mode threshold value is set to 2 [p.u.] which is 2 times the power rated capacity of the first DC-DC converter 1.

The first mode threshold value can be further subdivided into a first mode threshold value A and a first mode threshold value B.

The first mode threshold value A may be larger than the first mode threshold value B. Further, the first mode threshold value A may be used as a threshold value at which transition from the first drive mode to the second drive mode is performed, and the first mode threshold value B may be used as a threshold value at which transition from the second drive mode to the first drive mode is performed. Consequently, hysteresis can be set for the threshold values as to mode transition.

At the time of the transition from the first drive mode to the second drive mode, the control device 11 changes the converter group to which the second DC-DC converter 2 belongs, to the first converter group, and makes a change such that PWM switching control is performed by using the first triangular wave carrier. Then, the control device 11 sets the third DC-DC converter 3 to belong to the second converter group and performs PWM switching control by using the second triangular wave carrier, to start an operation.

At this time, a power ratio in each converter group only has to be set according to the ratio between the power rated capacities of the respective DC-DC converters. In the second drive mode in embodiment 1, the power ratio between the first DC-DC converter 1 and the second DC-DC converter 2 is set to 1:2 according to the ratio between the power capacities of the respective DC-DC converters, and the first converter group can make an output of up to 3 [p.u.] which is the total value of the power capacities.

The second drive mode corresponds to a load of 66% and a load of 100% in FIG. 5.

Next, an operation of the power conversion device 100 in the case where the load 15 is reduced, will be described.

If the load 15 is reduced during an operation in the second drive mode and the power of the load 15 becomes lower than the first mode threshold value, the control device 11 stops driving the third DC-DC converter 3, changes the converter group to which the second DC-DC converter 2 belongs, to the second converter group, and performs PWM switching control by using the second triangular wave carrier.

The control device 11 changes the number of DC-DC converters that are driven, according to the state of the load 15 so that the usage rate of the DC-DC converters is improved, and power loss at low load is reduced. In addition, it is possible to realize reduction, due to an interleave operation, of high-frequency current that flows to the first capacitor 13. Thus, it is possible to realize improvement of power conversion efficiency at low load and size reduction of the capacitor.

In order to maximally make use of the ability of the device, the power capacities of the first to third DC-DC converters 1 to 3 are preferably selected such that the total output in the first converter group and the total output in the second converter group become equal to each other when all the DC-DC converters connected in parallel as in embodiment 1 are operating.

The power capacities of the first to $N^{th}$ DC-DC converters 1 to N are preferably selected such that the total output in the first converter group and the total output in the second converter group become equal to each other when all the first to $N^{th}$ DC-DC converters 1 to R connected in parallel are operating.

Next, an exemplary configuration in which the power conversion device according to embodiment 1 is mounted to an aircraft, will be described with reference to FIG. 6.

Figure 6:
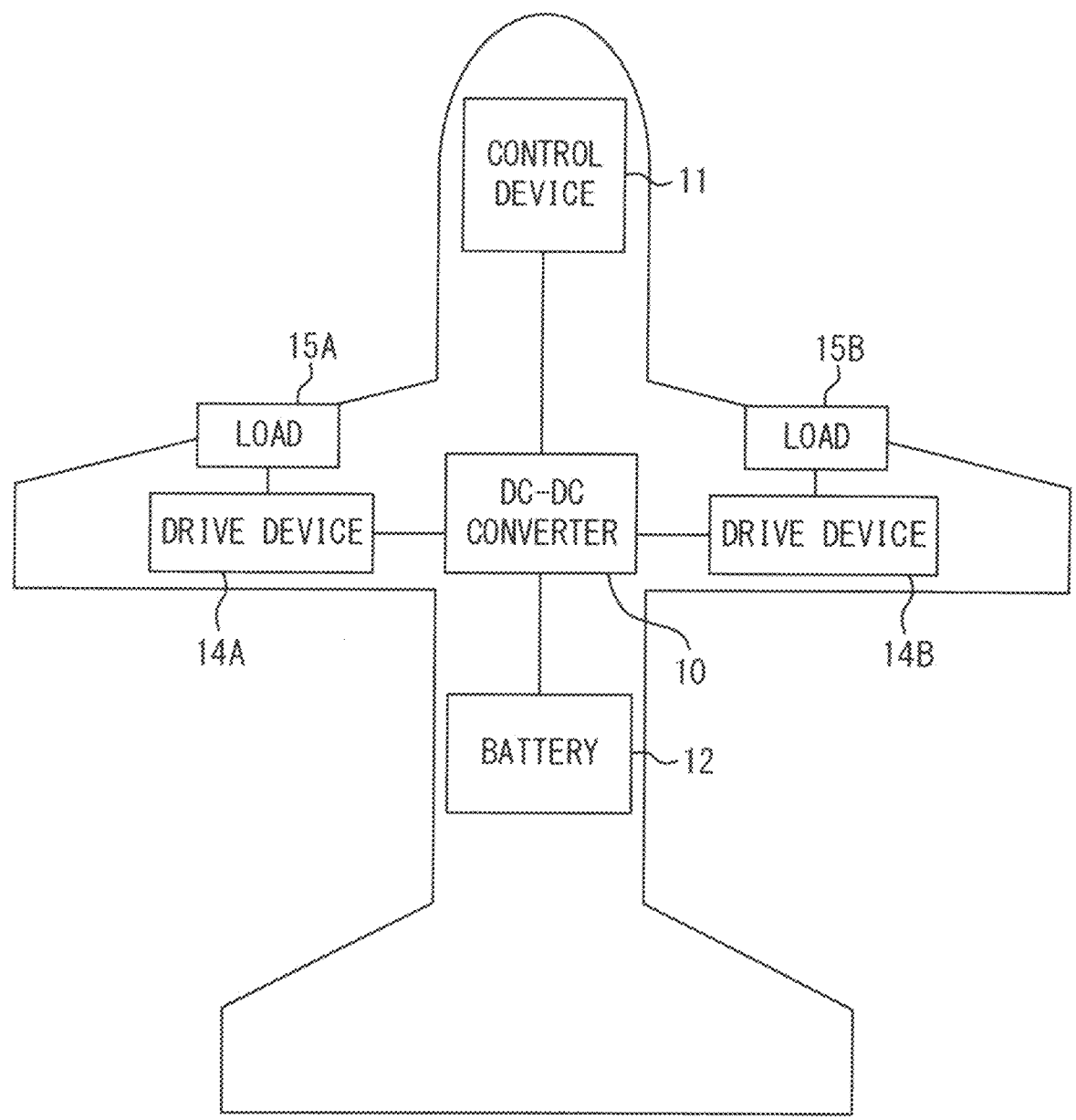
FIG. 6 is a configuration diagram of an example in which a plurality of parallel DC-DC converters in the power conversion device according to embodiment 1 are mounted to an aircraft.

It is noted that, in FIG. 6, loads represented by motors for a cabin air compressor are assumed and denoted by 15A and 15B. Load drive devices 14A and 14B which function as driving inverters are provided.

With DC-DC converters 10 being at the center of the system in FIG. 6, the system includes the first battery 12 as a DC source, the load drive devices 14A and 14B which function as inverters for driving the loads 15A and 15B, and the control device 11.

Here, the DC-DC converters 10 are, for example, three DC-DC converters connected in parallel.

The control device 11 controls DC power from the first battery 12 according to power of each of the loads 15A and 15B such that the optimum efficiency is obtained for the DC-DC converters 10. Further, the control device 11 causes necessary power to be supplied to the loads 15A and 15B via the load drive devices 14A and 14B.

Embodiment 1 has given description about the case where the first to $N^{th}$ DC-DC converters 1 to N, the number of which is three or more, are implemented by two or more types of converters that have different power rated capacities. Specifically, an example in which the power rated capacities of the first to third DC-DC converters 1 to 3 are respectively set to 1 [p.u.], 2 [p.u.], and 3 [p.u.], has been described.

However, the control method for the power conversion device according to embodiment 1 is applicable also to the case where the power rated capacities of all the N DC-DC converters are equal to one another.

For example, it is assumed that four DC-DC converters are provided, and the power capacities of all of first to fourth DC-DC converters 1 to 4 are each 1 [p.u.].

In the first drive mode, the control device 11 causes the first DC-DC converter 1 to operate in the first converter group, causes the second DC-DC converter 2 to operate in the second converter group, and causes the third DC-DC converter 3 and a fourth DC-DC converter 4 to stop. The first and second converter groups each output power of 1 [p.u.]. The first and second converter groups output total power of 2 [p.u.].

In the second drive mode, the control device 11 causes the first DC-DC converter 1 and the second DC-DC converter 2 to operate in the first converter group, causes the third DC-DC converter 3 to operate in the second converter group, and causes the fourth DC-DC converter 4 to stop. The first and second converter groups each output power of 1 [p.u.]. The first and second converter groups output total power of 2 [p.u.].

In this case, the maximum output is not increased, and thus transition to a third drive mode is performed immediately.

In the third drive mode, the control device 11 readjusts the converter groups such that the second DC-DC converter 2 and the third DC-DC converter 3 operate in the first converter group, and the first DC-DC converter 1 and the fourth DC-DC converter 4 operate in the second converter group.

In this state, the first and second converter groups each output power of 2 [p.u.]. The first and second converter groups output total power of 4 [p.u.].

It is noted that the readjustment of the converter groups will be described also in embodiment 3.

As described above, the power conversion device according to embodiment 1 includes three DC-DC converters connected in parallel, and a control device for controlling the DC-DC converters. The power conversion device further includes a first converter group on which PWM switching control is performed by using a first carrier, and a second converter group on which PWM switching control is performed by using a second carrier having a phase that differs from a phase of the first carrier. One or more of the DC-DC converters are assigned to each converter group. A plurality of drive modes in each of which the number of the DC-DC converters that are driven and the converter groups are set, are provided. The control device switches the drive modes through comparison between a preset threshold value and a total output of the three DC-DC converters, the control device setting a ratio between a total output in the first converter group and a total output in the second converter group to fall within a predetermined range.

Therefore, in the power conversion device according to embodiment 1, optimization of power conversion efficiency and ripple reduction of output current can be realized regardless of the number of DC-DC converters that are driven in parallel.

Embodiment 2

A power conversion device according to embodiment 2 has four DC-DC converters connected in parallel unlike in embodiment 1 in which the three DC-DC converters are connected in parallel.

The power conversion device according to embodiment 2 will be described focusing on the differences from embodiment 1 with reference to FIG. 7 which is a configuration diagram of the power conversion device, and FIG. 8 which is a diagram for explaining drive modes and outputs of the four DC-DC converters.

In the configuration diagram for embodiment 2, components identical or corresponding to those in embodiment 1 are denoted by the same reference characters.

The overall configuration of a power conversion device 200 according to embodiment 2 will be described with reference to FIG. 7.

With the four DC-DC converters connected in parallel (the first DC-DC converter 1, the second DC-DC converter 2, the third DC-DC converter 3, and the fourth DC-DC converter 4) being at the center of the power conversion device 200, the power conversion device 200 includes the first battery 12 as a DC source connected to an input side of the first to fourth DC-DC converters 1 to 4; the first capacitor 13, for a CC link, which is connected to an output side of the first to fourth DC-DC converters 1 to 4; and the load drive device 14 for supplying a predetermined level of power to the load 15 with the first capacitor 13 being set to a DC busbar. The power conversion device 200 further includes the control device 11 which controls the first to fourth DC-DC converters 1 to 4 to perform a predetermined function of the power conversion device 200.

Figure 7:
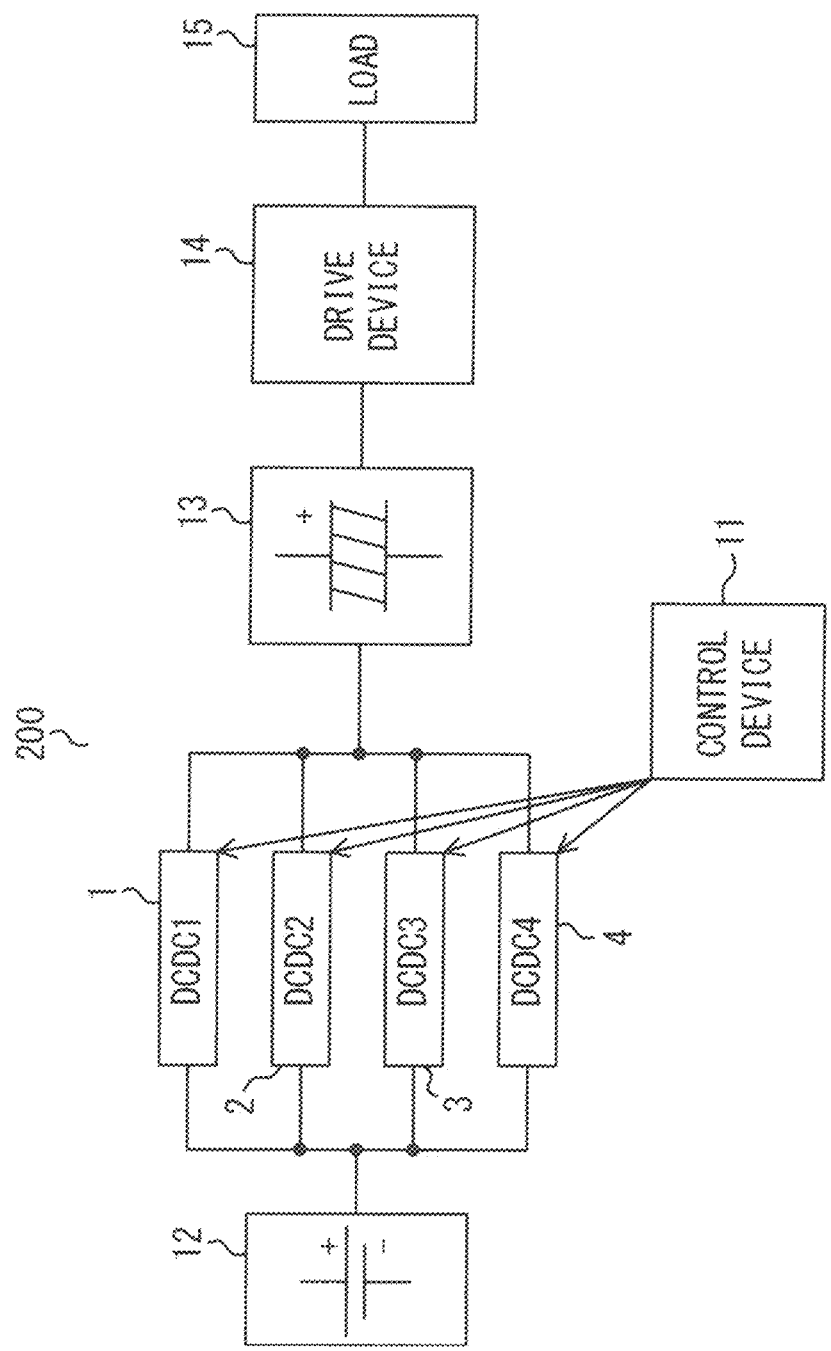
FIG. 7 is a configuration diagram of a power conversion device according to embodiment 2.
Figure 8:
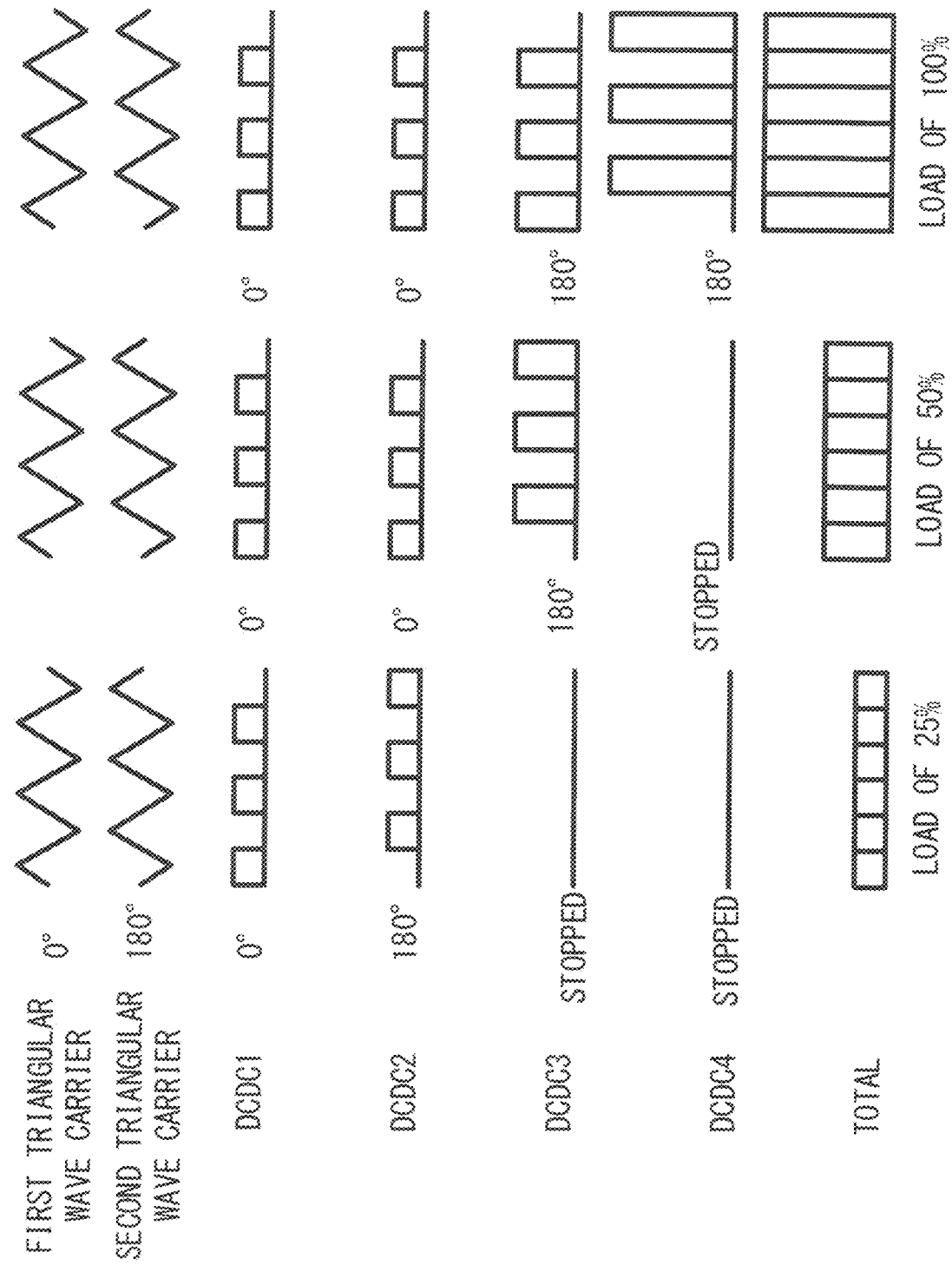
FIG. 8 is a diagram for explaining drive modes and outputs of four DC-DC converters in the power conversion device according to embodiment 2.

In FIG. 7, the first DC-DC converter 1 is described as DCDC1, the second DC-DC converter 2 is described as DCDC2, the third DC-DC converter 3 is described as DCDC3, and the fourth DC-DC converter 4 is described as DCDC4.

An operation of the power conversion device 200 will be described with reference to FIG. 8.

Embodiment 2 will give description about the case where the power rated capacity of the first DC-DC converter 1 is set to 1 [p.u.], the power rated capacity of the second DC-DC converter 2 is set to 1 [p.u.], the power rated capacity of the third DC-DC converter 3 is set to 2 [p.u.], and the power rated capacity of the fourth DC-DC converter 4 is set to 4 [p.u.].

Firstly, an operation of the power conversion device 200 in the case where the load 15 is increased from a low-loaded state, will be described.

In the first drive mode which is set as a range in which power of the load 15 is lowest, the first DC-DC converter 1 and the second DC-DC converter 2 are operating. The third DC-DC converter 3 and the fourth DC-DC converter 4 are stopped.

In the first drive mode, the first DC-Dr converter 1 is operating while belonging to the first converter group, and the second DC-DC converter 2 is operating while belonging to the second converter group.

The first DC-DC converter 1 and the second DC-DC converter 2 have the same power capacity. In the first drive mode in embodiment 2, it is possible to output, as DC current, a smoothed current of up to 2 [p.u.] which is a load of about 25% of the full load, as shown in FIG. 8.

If the power of the load 15 is increased and exceeds 2 [p.u.], the power capacity becomes insufficient. Consequently, transition to the second drive mode is performed. In embodiment 2, this power value of 2 [p.u.] is set as a first mode threshold value.

The first mode threshold value is set to be equal to or less than 2 times the power value of a group that has a lower total power capacity out of the first converter group and the second converter group.

The first mode threshold value may be further subdivided into a first mode threshold value A and a first mode threshold value B. Further, the first mode threshold value A may be larger than the first mode threshold value B. Further, the first mode threshold value A may be used as a threshold value at which transition from the first drive mode to the second drive mode is performed, and the first mode threshold value B may be used as a threshold value at which transition from the second drive mode to the first drive mode is performed. Consequently, hysteresis can be set for the threshold values as to mode transition.

At the time of the transition from the first drive mode to the second drive mode, the control device 11 changes the converter group to which the second DC-DC converter 2 belongs, to the first converter group, and makes a change such that PWM switching control is performed by using the first triangular wave carrier. Then, the control device 11 sets the third DC-DC converter 3 to belong to the second converter group and performs PWM switching control by using the second triangular wave carrier, to start an operation.

As described above, the proportions of the output powers of the first converter group and the second converter group are equal to each other. Thus, the total power of the first DC-DC converter 1 and the second DC-DC converter 2, and the power of the third DC-DC converter 3, are set to be the same output, and, in the second drive mode in embodiment 2, it is possible to make an output (such as one shown in FIG. 8) of up to 4 [p.u.] which is a load of about 50% of the full load.

It the power of the load 15 is further increased and exceeds 4 [p.u.], the power capacity becomes insufficient. Consequently, transition to the third drive mode is performed. In embodiment 2, this power value of 4 [p.u.] is set as a second mode threshold value.

The second mode threshold value is set to be equal to or less than 2 times the power value of a group that has a lower total power capacity out of the first converter group and the second converter group. The second mode threshold value can be further subdivided into a second mode threshold value A and a second mode threshold value B.

The second mode threshold value A may be larger than the second mode threshold value B. Further, the second mode threshold value A may be used as a threshold value at which transition from the second drive mode to the third drive mode is performed, and the second mode threshold value B may be used as a threshold value at which transition from the third drive mode to the second drive mode is performed. Consequently, hysteresis can be set for the threshold values as to mode transition.

At the time of the transition to the third drive mode, the control device 11 changes the converter group to which the third DC-DC converter 3 belongs, to the first converter group, and makes a change such that PWM switching control is performed by using the first triangular wave carrier. Then, the control device 11 sets the fourth DC-DC converter 4 to belong to the second converter group and performs PWM switching control by using the second triangular wave carrier, to start an operation.

The proportions of the output powers of the first converter group and the second converter group are equal to each other. Thus, the total power of the first DC-DC converter 1, the second DC-DC converter 2, and the third DC-DC converter 3 belonging to the first converter group, and the power of the fourth DC-DC converter 4 belonging to the second converter group, are the same output. Therefore, in the third drive mode in embodiment 2, it is possible to make an output (such as one shown in FIG. 8) of up to 8 [p.u.] which is a load of about 100% of the full load.

In an operation of the power conversion device 200 in the case where the load 15 is reduced, the drive modes are switched in the order of the third drive mode, the second drive mode, and the first drive mode, in contrast to the case where the drive modes are switched in ascending order. Since the threshold values for mode switching have been explained in the descriptions about the case where the load 15 is increased, the operation of the power conversion device 200 regarding the threshold values are not described here.

Embodiment 2 has given description about the case of a configuration in which the four DC-DC converters are connected in parallel. From this point on, the case of a configuration in which N DC-DC converters are connected in parallel, will be described.

Firstly, the case where the load 15 is increased will be described. It is noted that no reference characters are given for generalizing description.

In a first drive mode, the control device causes a DC-DC converter having a smallest power rated capacity among the DC-DC converters to operate as a first DC-DC converter. Further, the control device causes a DC-DC converter having a second smallest power rated capacity among the DC-DC converters to operate as a second DC-DC converter. Further, the control device assigns the first DC-DC converter to the first converter group. Further, the control device assigns the second DC-DC converter to the second converter group.

If an output of the load exceeds a first threshold value, the control device causes transition to a second drive mode. Further, the control device sets a DC-DC converter having a smallest power rated capacity next to the second DC-DC converter among the DC-DC converters to start operating as a third DC-DC converter. Further, the control device changes an assignment of the second DC-DC converter to the first converter group. Further, the control device assigns the third DC-DC converter to the second converter group.

The control device repeats mode switching each time the output of the load is increased. If the total output of the N DC-CC converters exceeds an $(N-1)^{th}$ threshold value, the control device causes transition to an $(N-1)^{th}$ drive mode. Further, the control device sets a DC-DC converter having a largest power rated capacity among the DC-DC converters to start operating as an $N^{th}$ DC-DC converter. Further, the control device changes an assignment of the $(N-1)^{th}$ DC-DC converter to the first converter group. Further, the control device assigns the $N^{th}$ DC-DC converter to the second converter group.

Next, the case where the load 15 is reduced will be described.

In an $(N-1)^{th}$ drive mode, the control device sets, as an $N^{th}$ DC-DC converter, a DC-DC converter having a largest power rated capacity among the DC-DC converters. Further, the control device performs an operation of assigning the NM DC-DC converter to the second converter group and performs an operation of assigning the $(N-1)^{th}$ to first DC-DC converters to the first converter group.

If an output of the load is reduced and becomes smaller than an $(N-2)^{th}$ threshold value, the control device causes transition to an $(N-2)^{th}$ drive mode. Further, the control device causes the $N^{th}$ DC-DC converter to stop operating. Further, the control device changes an assignment of the $(N-1)^{th}$ DC-DC converter to the second converter group.

The control device repeats mode switching each time the output of the load is reduced. If the output of the load becomes smaller than a first threshold value, the control device causes transition to a first drive mode. Further, the control device causes the third DC-DC converter having a largest power rated capacity next to the second DC-DC converter to stop operating. Further, the control device changes an assignment of the second DC-DC converter to the second converter group. Further, the control device causes the first DC-DC converter to continue to operate in the first converter group.

In embodiment 2, the power rated capacities of the first DC-DC converter 1 and the second DC-DC converter 2 are set to a same power capacity S, the power rated capacity of the third DC-DC converter 3 is set to a power capacity T which is 2 times the power capacity S (i.e., 2S), and the power rated capacity of the fourth DC-DC converter 4 is set to a power capacity U which is 2 times the power capacity T (i.e., 2T or 4S).

In the power conversion device according to embodiment 2, it is possible to make full use of the power capacities usable by the respective DC-DC converters (first to fourth DC-DC converters 1 to 4) in each of the drive modes (drive modes 1 to 3). Consequently, change of the number of the power converters that are driven and improvement of the power usage rates of the power converters, enable enhancement of efficiency at low load.

As described above, the power conversion device according to embodiment 2 has the four DC-DC converters connected in parallel.

Therefore, in the power conversion device according to embodiment 2, optimization of power conversion efficiency and ripple reduction of output current can be realized regardless of the number of DC-DC converters that are driven in parallel.

Embodiment 3

A power conversion device according to embodiment 3 has seven DC-DC converters connected in parallel, and further has a function of readjusting the converter groups to which the DC-DC converters belong.

The power conversion device according to embodiment 3 will be described focusing on the differences from embodiment 1 with reference to FIG. 9 which is a configuration diagram of the power conversion device, and FIG. 10 and FIG. 11 which are diagrams for explaining drive modes and converter group states of the seven DC-DC converters.

In the configuration diagram for embodiment 3, components identical or corresponding to those in embodiment 1 are denoted by the same reference characters.

The overall configuration of a power conversion device 300 according to embodiment 3 will be described with reference to FIG. 9.

With the seven DC-DC converters connected in parallel (the first DC-DC converter 1, the second DC-DC converter 2, the third DC-DC converter 3, the fourth DC-DC converter 4, a fifth DC-DC converter 5, a sixth DC-DC converter 6, and a seventh DC-DC converter 7) being at the center of the power conversion device 300, the power conversion device 300 includes the first battery 12 as a DC source connected to an input side of the first to seventh DC-DC converters 1 to 7; the first capacitor 13, for a DC link, which is connected to an output side of the first to seventh DC-DC converters 1 to 7; and the load drive device 14 for supplying a predetermined level of power to the load 15 with the first capacitor 13 being set to a DC busbar.

The power conversion device 300 further includes the control device 11 which controls the first to seventh DC-DC converters 1 to 7 to perform a predetermined function of the power conversion device 300.

Figure 9:
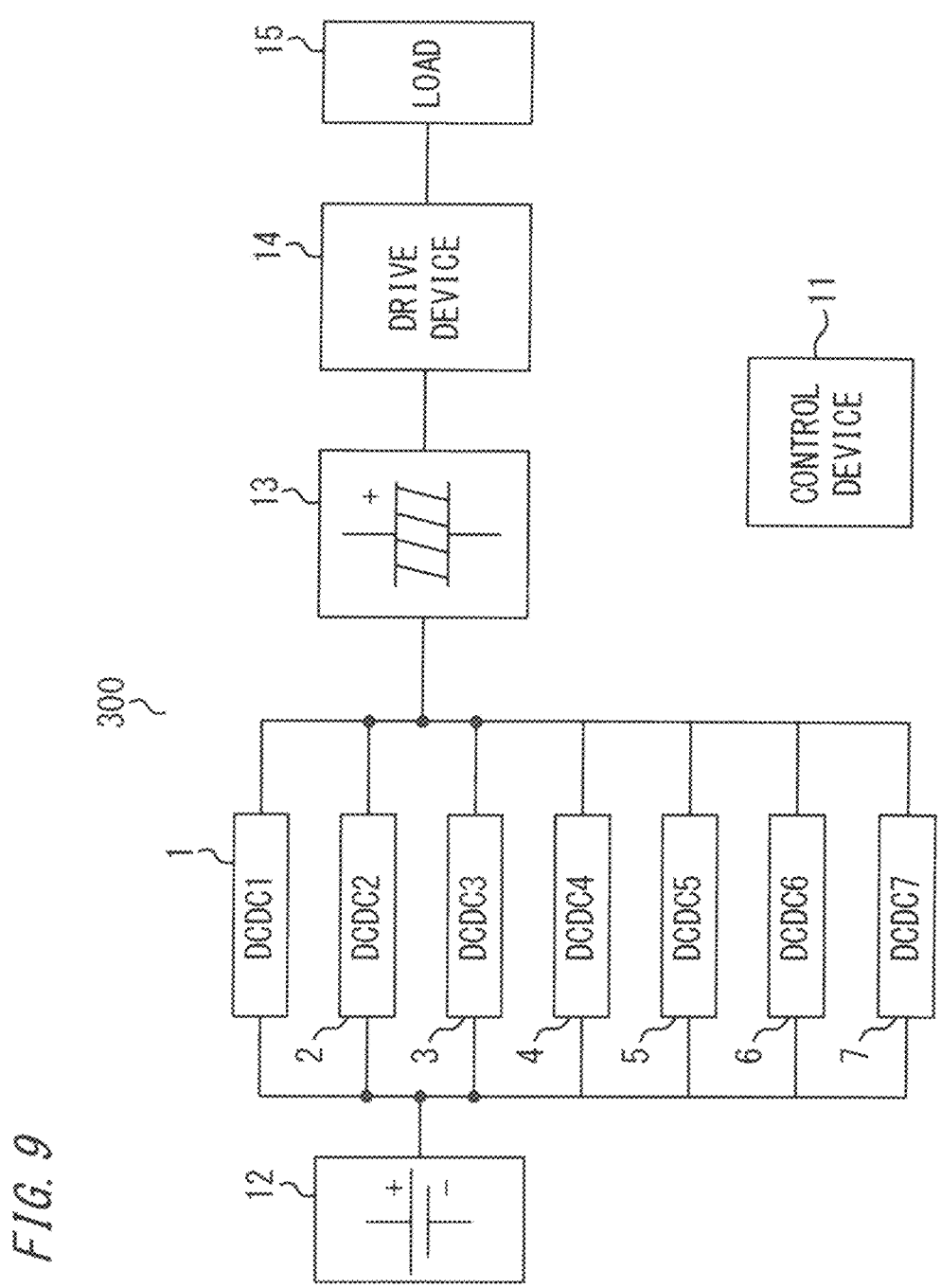
FIG. 9 is a configuration diagram of a power conversion device according to embodiment 3.

In FIG. 9, the first DC-DC converter 1 is described as DCDC1, the second DC-DC converter 2 is described as DCDC2, the third DC-DC converter 3 is described as DCDC3, the fourth DC-DC converter 4 is described as DCDC4, the fifth DC-DC converter 5 is described as DCDC5, the sixth DC-DC converter 6 is described as DCDC6, and the seventh DC-DC converter 7 is described as DCDC7.

FIG. 9 does not show control lines through which the control device 11 controls the first to seventh DC-DC converters 1 to 7.

An operation of the power conversion device 300 will be described with reference to FIG. 10 and FIG. 11.

FIG. 10 and FIG. 11 show, for each of the drive modes (first drive mode to sixth drive mode), whether the first to seventh DC-DC converters 1 to 7 belong to the first converter group or the second converter group, or are stopped. In addition, FIG. 10 and FIG. 11 show the power proportions of the first converter group and the second converter group in the drive modes (first drive mode to sixth drive mode).

It is noted that FIG. 10 explains the first to third drive modes, and FIG. 11 explains the fourth to sixth drive modes.

In initial setting of the power conversion device 300, the drive serial number of the first DC-DC converter 1 is set to 1, the drive serial number of the second DC-DC converter 2 is set to 2, the drive serial number of the third DC-DC converter 3 is set to 3, the drive serial number of the fourth DC-DC converter 4 is set to 4, the drive serial number of the fifth DC-DC converter 5 is set to 5, the drive serial number of the sixth DC-DC converter 6 is set to 6, and the drive serial number of the seventh DC-DC converter 7 is set to 7.

A smaller power rated capacity leads to setting of a smaller drive serial number. If DC-DC converters have the same capacity, the DC-DC converters are ranked with corresponding drive serial numbers according to initial setting on the control device 11 side.

It is noted that the drive serial number of each DC-DC converter and the reference character of the DC-DC converter match with each other in embodiment 3, and thus the drive serial numbers are not shown in FIG. 10 and FIG. 11.

In embodiment 3, the power rated capacity of the first DC-DC converter 1 is set to 1 [p.u.], the power rated capacity of the second DC-DC converter 2 is set to 2 [p.u.], the power rated capacity of the third DC-DC converter 3 is set to 3 [p.u.], the power rated capacity of the fourth DC-DC converter 4 is set to 4 [p.u.], the power rated capacity of the fifth DC-DC converter 5 is set to 5 [p.u.], the power rated capacity of the sixth DC-DC converter 6 is set to 6 [p.u.], and the power rated capacity of the seventh DC-DC converter 7 is set to 7 [p.u.].

In embodiment 3, the difference between the total power capacity which is the total value of the power rated capacities in the first converter group and the total power capacity which is the total value of the power rated capacities in the second converter group, is obtained. If the difference between the total power capacities exceeds a predetermined allowable power capacity difference, readjustment is performed on the converter groups to which DC-DC converters that are driven belong.

The allowable power capacity difference is set to the power rated capacity value of a DC-DC converter assigned with drive serial number 1 which is set as a drive serial number at which the power rated capacity is smallest.

In embodiment 3, 1 [p.u.] which is the power rated capacity of the first DC-DC converter 1 assigned with drive serial number 1 is set as the allowable power capacity difference.

After the number of the DC-DC converters that are driven is changed through mode transition, the control device 11 compares the total power capacity in the first converter group and the total power capacity in the second converter group with each other.

In the case where the absolute value of the difference is larger than the allowable power capacity difference, if the total power capacity in the first converter group is larger, the control device 11 makes, for the first DC-DC converter assigned with drive serial number 1, a change from the first converter group to the second converter group. The control device 11 repeats, for the DC-DC converters belonging to the first converter group, the change to the second converter group in ascending order of drive serial number until the difference between the total power capacities falls within the allowable power capacity difference.

In contrast, if the total power capacity in the second converter group is larger, the control device 11 makes, for the first DC-DC converter 1 assigned with drive serial number 1, a change from the second converter group to the first converter group. The control device 11 repeats, for the DC-DC converters belonging to the second converter group, the change to the first converter group in ascending order of drive serial number until the difference between the total power capacities falls within the allowable power capacity difference.

By performing the above operations by the control device 11, the total power capacities in the first converter group and the second converter group are balanced as much as possible, and the power conversion device 300 is capable of the maximum output in each drive mode.

As described above, the power conversion device according to embodiment 3 has the seven DC-DC converters connected in parallel and further has a function of readjusting the converter groups to which DC-DC converters belong.

Therefore, in the power conversion device according to embodiment 3, optimization of power conversion efficiency and ripple reduction of output current can be realized regardless of the number of DC-DC converters that are driven in parallel.

Embodiment 4

Embodiment 4 will give description about an operation of a function of, if a DC-DC converter has failed in the power conversion device according to embodiment 3, readjusting a converter group to which the DC-DC converter belongs.

An operation of a power conversion device according to embodiment 4 will be described with reference to FIG. 12 which is a diagram for explaining a drive mode and converter group states of the DC-DC converters at the time of a failure.

A configuration of the power conversion device according to embodiment 4 is the same as the configuration of the power conversion device 300 according to embodiment 3, and thus reference to FIG. 9 will be made as appropriate.

It is noted that embodiment 4 is based on the assumption of the case where the third DC-DC converter has failed during normal drive in the third drive mode described in embodiment 3.

FIG. 12 shows operation states of the first to seventh DC-DC converters 1 to 7 in the case where the third DC-DC converter 3 has failed during operations, in the third drive mode, that are normal operations of the first to seventh DC-DC converters 1 to 7.

Firstly, as described in embodiment 3, the drive serial number of the first DC-DC converter 1 is set to 1, the drive serial number of the second DC-DC converter 2 is set to 2, the drive serial number of the third DC-DC converter 3 is set to 3, the drive serial number of the fourth DC-DC converter 4 is set to 4, the drive serial number of the fifth DC-DC converter 5 is set to 5, the drive serial number of the sixth DC-DC converter 6 is set to 6, and the drive serial number of the seventh DC-DC converter 7 is set to 7 in the initial setting.

Embodiment 4 will give description with a smaller power rated capacity leading to setting of a smaller drive serial number. However, a smaller power rated capacity may lead to setting of a larger drive serial number.

If the third DC-DC converter 3 has failed, the control device 11 excludes the third DC-DC converter 3 from the other DC-DC converters connected in parallel. At this time, the control device 11 changes the setting of the drive serial numbers such that the drive serial number of the fourth DC-DC converter 4 is set to 3, the drive serial number of the fifth DC-DC converter 5 is set to 4, the drive serial number of the sixth DC-DC converter 6 is set to 5, and the drive serial number of the seventh DC-DC converter 1 is set to 6.

That is, the control device 11 makes setting so as to carry down the drive serial number of each DC-DC converter having been assigned with a drive serial number that is larger than that assigned to the DC-DC converter having failed.

That is, if a DC-DC converter has failed during normal drive, the control device 11 performs, with the remaining normal DC-DC converters, adjustment between the first converter group and the second converter group such that the difference between the total power capacities falls within the allowable power capacity difference.

As described above, in the power conversion device according to embodiment 4, the function of readjusting the converter groups to which the DC-DC converters belong makes it possible to adjust the converter groups so as to maintain power balance at the time of drive mode transition even if a device having failed is excluded.

Therefore, in the power conversion device according to embodiment 4, optimization of power conversion efficiency and ripple reduction of output current can be realized regardless of the number of DC-DC converters that are driven in parallel, and furthermore, power balance among the converter groups can be maintained even when a DC-DC converter has failed.

Embodiment 5

A power conversion device according to embodiment 5 has a function of saving, as drive information, converter group settings and stoppage settings about the respective DC-DC converters in all the drive moles.

The power conversion device according to embodiment 5 will be described with appropriate reference to FIG. 9, FIG. 10, and FIG. 11 for embodiment 3.

In the power conversion device according to embodiment 5, the control device 11 ascertains the power capacities of the respective first to $N^{th}$ DC-DC converters 1 to N connected between the first battery 12 as a DC source and the first capacitor 13 for a DC link.

The control device 11 can obtain these power capacities through setting at the time of shipment and obtain information about a connected device through communication.

In embodiment 5, the method for setting the converter groups in each of embodiment 3 and embodiment 4 is saved as drive information that is expressed as a map for all the drive modes upon activation of the power conversion device and after a DC-DC converter having failed is excluded.

That is, for each drive mode, computation is performed sequentially as to converter group setting and stoppage setting about the DC-DC converters assigned with the drive serial numbers. Consequently, converter group settings and stoppage settings for all the drive modes are saved as drive information such as ones shown in FIG. 10 and FIG. 11.

The control device 11 activates the power conversion device. After the N DC-DC converters start making outputs, the control device 11 reads the drive information upon drive mode transition, to change each of settings about drive states indicating that the first to $N^{th}$ DC-DC converters 1 to N are operated or stopped in the converter groups.

The control device can also receive the drive information from outside instead of computing the drive information upon activation.

As described above, the power conversion device according to embodiment 5 has a function of saving, as drive information, converter group settings and stoppage settings about the respective DC-DC converters in all the drive modes.

Therefore, in the power conversion device according to embodiment 5, optimization of power conversion efficiency and ripple reduction of output current can be realized regardless of the number of DC-DC converters that are driven in parallel. Furthermore, computational burden during drive by the control device can be reduced.

Embodiment 6

In a power conversion device according to embodiment 6, PWM switching control is performed on the DC-DC converters by using three triangular wave carriers having phases that differ from one another by 120 degrees.

The power conversion device according to embodiment 6 will be described focusing on the differences from embodiment 2 with reference to FIG. 13 which is a diagram for explaining drive modes and outputs of the four DC-DC converters.

It is noted that reference to FIG. 7 and FIG. 8 for embodiment 2 will be made as appropriate.

In embodiment 6, the first to fourth DC-DC converters 1 to 4 connected between the first battery 12 as a DC source and the first capacitor 13 for a DC link, will be described as application examples.

Embodiment 6 includes the first converter group on which PWM switching control is performed by using the first triangular wave carrier, the second converter group on which PWM switching control is performed by using the second triangular wave carrier having a phase that differs from the phase of the first triangular wave carrier by 120 degrees, and a third converter group on which PWM switching control is performed by using a third triangular wave carrier having a phase that differs from the phase of the first triangular wave carrier by 240 degrees.

One or more of the first to fourth DC-DC converters 1 to 4 are driven in each converter group.

For example, in the case of a 3-fold boost ratio, current flows at a time ratio of about 33% for an output from each DC-DC converter. By equally outputting output currents from the three converter groups in which the difference of 120 degrees is present among the phases, the currents are combined to become a current that is continuous and smoothed. As a result, the effective value of high-frequency current can be reduced.

For example, the power rated capacity of the first DC-DC converter 1 is set to 1 [p.u.], the power rated capacity of the second DC-DC converter 2 is set to 1 [p.u.], the power rated capacity of the third DC-DC converter 3 is set to 2 [p.u.], and the power rated capacity of the fourth DC-DC converter 4 is set to 2 [p.u.].

Figure 13:
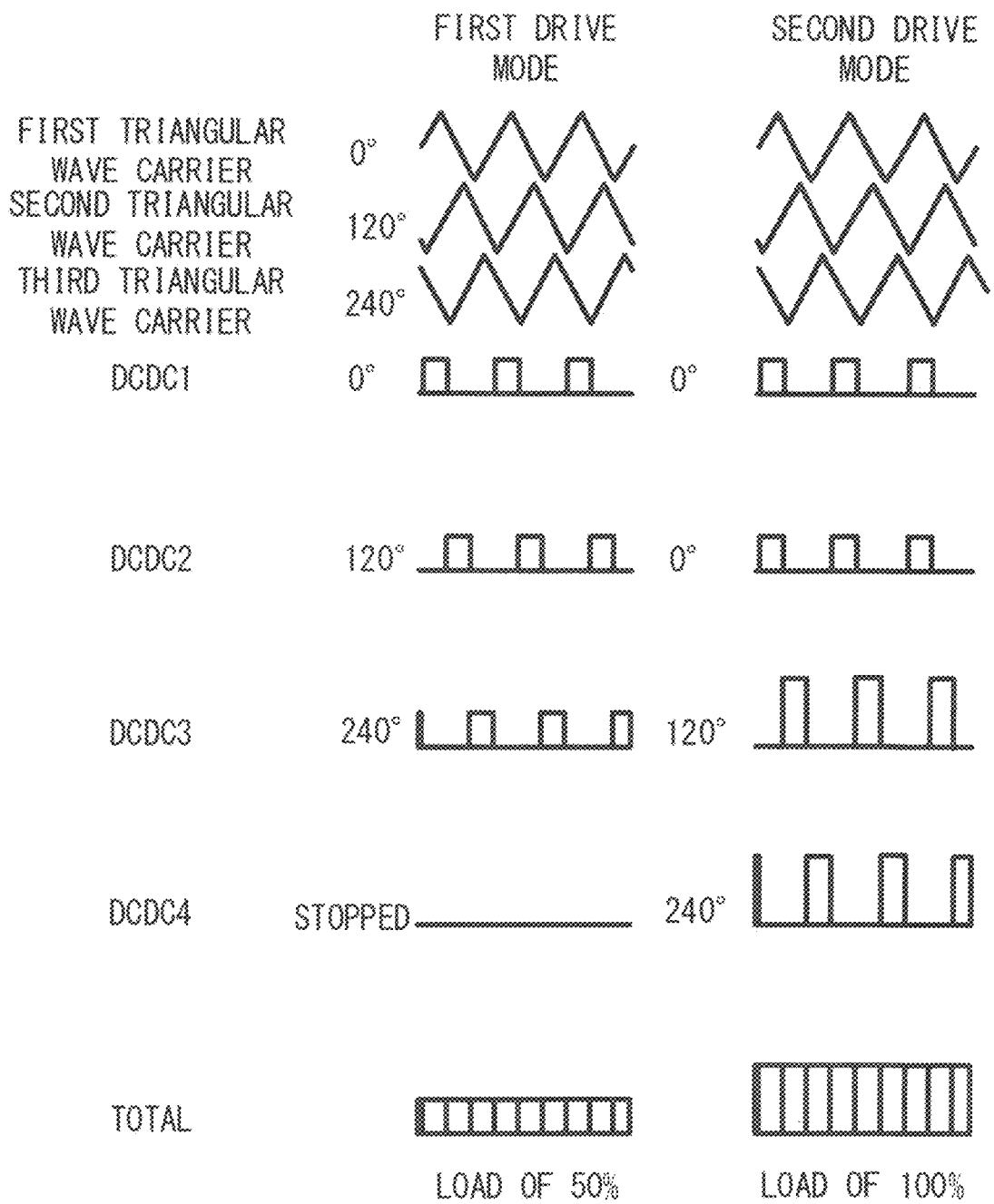
FIG. 13 is a diagram for explaining drive modes and outputs of four DC-DC converters in a power conversion device according to embodiment 6.

FIG. 13 shows the triangular wave carriers and output currents of the respective DC-DC converters. Since the boost choppers perform about 3-fold boosting of voltage, the conduction ratio of each chopper is about 33%. Further, by causing currents equal to one another to flow, the combined value of output currents that flow from the respective choppers to the first capacitor 13 for a DC link, is smoothed similarly to a continuous DC current, and a high-frequency component is suppressed.

In the first drive mode, the first DC-DC converter 1 is operating while belonging to the first converter group, the second DC-DC converter 2 is operating while belonging to the second converter group, and the third DC-DC converter 3 is operating while belonging to the third converter group. The first DC-DC converter 1 and the second DC-DC converter 2, and the third DC-DC converter 3, output the same power and, in the first drive mode, it is possible to output a smoothed current (such as one shown in FIG. 13) of up to 3 [p.u.] (3 times the rated capacity of the first DC-DC converter 1) which is a load of about 50% of the full load.

If the power of the load 15 is increased and exceeds 3 [p.u.], the power capacity becomes insufficient. Consequently, transition to the second drive mode is performed. In embodiment 6, the power value of 3 [p.u.] is set as a first mode threshold value.

The first mode threshold value can be further subdivided into a first mode threshold value A and a first mode threshold value B.

The first mode threshold value A may be larger than the first mode threshold value B. Further, the first mode threshold value A may be used as a threshold value at which transition from the first drive mode to the second drive mode is performed, and the first mode threshold value B may be used as a threshold value at which transition from the second drive mode to the first drive mode is performed. Consequently, hysteresis can be set for the threshold values as to mode transition.

At the time of the transition from the first drive mode to the second drive mode, the control device 11 changes the converter group to which the second DC-DC converter 2 belongs, to the first converter group, and makes a change such that PWM switching control is performed by using the first triangular wave carrier. Further, the control device 11 makes, for the third DC-DC converter 3, a change to the second converter group and performs PWM switching control by using the second triangular wave carrier. Moreover, the control device 11 sets the fourth DC-DC converter 4 to belong to the third converter group and performs PWM switching control by using the third triangular wave carrier.

The proportions of the output powers of the first converter group, the second converter group, and the third converter group are equal to one another. Thus, the total power of the first DC-DC converter 1 and the second DC-DC converter 2, the power of the third DC-DC converter 3, and the power of the fourth DC-DC converter 4, are set to be the same output. In the second drive mode in embodiment 6, it is possible to make outputs ranging from an output that is a load of 50% to an output of 6 [p.u.] that is a load of 100, as shown in FIG. 13.

This is generalized as follows. That is, X converter groups are prepared, and the phase of each triangular wave carrier for use in PWM switching control is shifted by (360/X) degrees, whereby the total output current of the DC-DC converters is smoothed.

By thus applying the power conversion device according to embodiment 6, reduction of high-frequency current that flows to the first capacitor can be realized also in the case of a boost ratio other than the 2-fold boost ratio. Therefore, Improvement of power conversion efficiency at low load and size reduction of the capacitor can be realized.

As described above, in the power conversion device according to embodiment 6, PWM switching control is performed on the DC-DC converters by using the three triangular wave carriers having phases that differ from one another by 120 degrees.

Therefore, in the power conversion device according to embodiment 6, optimization of power conversion efficiency and ripple reduction of output current can be realized regardless of the number of DC-DC converters that are driven in parallel. Furthermore, this configuration is applicable also to a chopper having a boost ratio other than the 2-fold boost ratio.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

INDUSTRIAL APPLICABILITY

The present disclosure can realize optimization of power conversion efficiency and ripple reduction of output current regardless of the number of DC-DC converters that are driven in parallel. Thus, the present disclosure is broadly applicable to power conversion devices.

DESCRIPTION OF THE REFERENCE CHARACTERS 1 first DC-DC converter
2 second DC-DC converter
3 third DC-DC converter
4 fourth DC-DC converter 5 first DC-DC converter
6 sixth DC-DC converter
7 seventh DC-DC converter
10 DC-DC converter
11 control device
12 first battery
13 first capacitor
14, 14A, 14B load drive device
15, 15A, 15B load
16 DC-DC converter input capacitor
21 reactor
Q1, Q2, Q3, Q4, Q5, Q6 power semiconductor element
100, 200, 300 power conversion device

The invention claimed is:

1. A power conversion device comprising:
N DC-DC converters connected in parallel, the DC-DC converters having an input side connected to a DC source and having an output side connected to a load, where N is 3 or more; and
a control circuitry configured to control the DC-DC converters, wherein
each of the N DC-DC converters belongs to either of
a first converter group on which PWM switching control is performed by using a first carrier, and
a second converter group on which PWM switching control is performed by using a second carrier having a phase that differs from a phase of the first carrier, or
stops operating,
at least one of the DC-DC converters is assigned to each of the first converter group and the second converter group, and
the control circuitry determines a plurality of drive modes in each of which the number of the DC-DC converters that are driven and the converter groups are set, the control circuitry switching the drive modes through comparison between a preset threshold value and supplied power to the load, the control circuitry setting a ratio between a total value of output power of the DC-DC converters belonging to the first converter group and a total value of output power of the DC-DC converters belonging to the second converter group to fall within a predetermined range,
wherein
in a first drive mode, the control circuitry
causes a DC-DC converter having a smallest power rated capacity among the DC-DC converters to operate as a first DC-DC converter,
causes a DC-DC converter having a second smallest power rated capacity among the DC-DC converters to operate as a second DC-DC converter,
assigns the first DC-DC converter to the first converter group, and
assigns the second DC-DC converter to the second converter group,
if supplied power to the load exceeds a first threshold value, the control circuitry
causes transition to a second drive mode,
sets a DC-DC converter having a smallest power rated capacity next to the second DC-DC converter among the DC-DC converters to start operating as a third DC-DC converter,
changes an assignment of the second DC-DC converter to the first converter group, and
assigns the third DC-DC converter to the second converter group,
the control circuitry repeats mode switching each time the supplied power to the load is increased, and
if the supplied power to the load exceeds an (N−2)th threshold value, the control circuitry
causes transition to an (N−1)th drive mode,
sets a DC-DC converter having a largest power rated capacity among the DC-DC converters to start operating as an Nth DC-DC converter,
changes an assignment of the (N−1)th DC-DC converter to the first converter group, and
assigns the Nth DC-DC converter to the second converter group.

2. The power conversion device according to claim 1, wherein the N DC-DC converters have at least two types of power rated capacities.

3. A power conversion device comprising:
N DC-DC converters connected in parallel, the DC-DC converters having an input side connected to a DC source and having an output side connected to a load, where N is 3 or more; and
a control circuitry configured to control the DC-DC converters, wherein
each of the N DC-DC converters
belongs to either of
a first converter group on which PWM switching control is performed by using a first carrier, and
a second converter group on which PWM switching control is performed by using a second carrier having a phase that differs from a phase of the first carrier, or
stops operating,
at least one of the DC-DC converters is assigned to each of the first converter group and the second converter group, and
the control circuitry determines a plurality of drive modes in each of which the number of the DC-DC converters that are driven and the converter groups are set, the control circuitry switching the drive modes through comparison between a preset threshold value and supplied power to the load, the control circuitry setting a ratio between a total value of output power of the DC-DC converters belonging to the first converter group and a total value of output power of the DC-DC converters belonging to the second converter group to fall within a predetermined range, wherein
in an $(N-1)^{th}$ drive mode, the control circuitry
sets, as an $N^{th}$ DC-DC converter, a DC-DC converter having a largest power rated capacity among the DC-DC converters,
performs an operation of assigning the $N^{th}$ DC-DC converter to the second converter group, and
performs an operation of assigning the (N−1)th to first DC-DC converters to the first converter group,
if supplied power to the load is reduced and becomes smaller than an $(N-2)^{th}$ threshold value, the control circuitry
causes transition to an $(N-2)^{th}$ drive mode,
causes the $N^{th}$ DC-DC converter to stop operating, and
changes an assignment of the $(N-1)^{th}$ DC-DC converter to the second converter group,
the control circuitry repeats mode switching each time the supplied power to the load is reduced, and
if the supplied power to the load becomes smaller than a first threshold value, the control circuitry
causes transition to a first drive mode, causes the third DC-DC converter having a largest power rated capacity next to the second DC-DC converter to stop operating, changes an assignment of the second DC-DC converter to the second converter group, and causes the first DC-DC converter to continue to operate in the first converter group.

4. The power conversion device according to claim 1, wherein a power rated capacity of an $N^{th}$ DC-DC converter is equal to or larger than a total value of power rated capacities of an $(N-1)^{th}$ DC-DC converter to a first DC-DC converter.

5. The power conversion device according to claim 1, wherein a power rated capacity of an $N^{th}$ DC-DC converter is 2 times a power rated capacity of an $(N-1)^{th}$ DC-DC converter.

6. The power conversion device according to claim 1, wherein a power rated capacity of a first DC-DC converter and a power rated capacity of a second DC-DC converter are equal to each other.

7. The power conversion device according to claim 1, wherein output powers from the converter group having two or more of the DC-DC converters are distributed to the respective DC-DC converters according to a ratio between power rated capacities of the DC-DC converters.

8. A power conversion device comprising:

N DC-DC converters connected in parallel, the DC-DC converters having an input side connected to a DC source and having an output side connected to a load, where N is 3 or more; and a control circuitry configured to control the DC-DC converters, wherein each of the N DC-DC converters belongs to either of a first converter group on which PWM switching control is performed by using a first carrier, and a second converter group on which PWM switching control is performed by using a second carrier having a phase that differs from a phase of the first carrier, or stops operating, at least one of the DC-DC converters is assigned to each of the first converter group and the second converter group, and the control circuitry determines a plurality of drive modes in each of which the number of the DC-DC converters that are driven and the converter groups are set, the control circuitry switching the drive modes through comparison between a preset threshold value and supplied power to the load, the control circuitry setting a ratio between a total value of output power of the DC-DC converters belonging to the first converter group and a total value of output power of the DC-DC converters belonging to the second converter group to fall within a predetermined range, wherein the control circuitry compares, after determining the number of the DC-DC converters that are driven, a total power capacity of the first converter group which is a total value of the power rated capacity of the DC-DC converters belonging to the first converter group and a total power capacity of the second converter group which is a total value of the power rated capacity of the DC-DC converters belonging to the second converter group with each other, and in a case where a difference between the total power capacities is larger than a preset allowable power capacity difference, if the total power capacity in the first converter group is larger than the total power capacity in the second converter group, the control circuitry makes, for a first DC-DC converter, a change from the first converter group to the second converter group, and the control circuitry repeats, for DC-DC converters belonging to the first converter group among the DC-DC converters, the change to the second converter group in ascending order of power rated capacity until the difference between the total power capacities falls within the allowable power capacity difference, and if the total power capacity in the second converter group is larger than the total power capacity in the first converter group, the control circuitry makes, for the first DC-DC converter, a change from the second converter group to the first converter group, and the control circuitry repeats, for DC-DC converters belonging to the second converter group among the DC-DC converters, the change to the first converter group in ascending order of power rated capacity until the difference between the total power capacities falls within the allowable power capacity difference.

9. The power conversion device according to claim 8, wherein the allowable power capacity difference is equal to or smaller than a power rated capacity of a DC-DC converter that can be driven and that has a smallest power rated capacity among the DC-DC converters.

10. The power conversion device according to claim 8, wherein upon drive mode transition, the control circuitry excludes a DC-DC converter having failed among the DC-DC converters, and performs, with the remaining DC-DC converters, adjustment between the first converter group and the second converter group such that the difference between the total power capacities falls within the allowable power capacity difference.

11. The power conversion device according to claim 1, wherein for each of the N DC-DC converters, the control circuitry creates drive information with respect to each drive mode upon activation, the drive information indicating an operation that is to be taken among three operations which are an operation of driving the DC-DC converter in the first converter group, an operation of driving the DC-DC converter in the second converter group, and an operation of stopping the DC-DC converter, and determines, according to the drive information, an operation of the DC-DC converter upon drive mode transition.

12. The power conversion device according to claim 1, wherein for each of the N DC-DC converters, the control circuitry receives drive information with respect to each drive mode from outside before start of drive, the drive information indicating an operation that is to be taken among three operations which are an operation of driving the DC-DC converter in the first converter group, an operation of driving the DC-DC converter in the second converter group, and an operation of stopping the DC-DC converter, and determines, according to the drive information, an operation of the DC-DC converter upon drive mode transition.

13. The power conversion device according to claim 1, wherein
a converter group is further included so that the number of the converter groups is three or more,
each of the N DC-DC converters belongs to any of the three or more converter groups or stops operating, and
the control circuitry performs PWM switching control on the converter groups by using carriers having phases that differ from one another.

14. The power conversion device according to claim 1, wherein each DC-DC converter is a multilevel chopper circuit.

15. The power conversion device according to claim 9, wherein
upon drive mode transition, the control circuitry
excludes a DC-DC converter having failed among the DC-DC converters, and
performs, with the remaining DC-DC converters, adjustment between the first converter group and the second converter group such that the difference between the total power capacities falls within the allowable power capacity difference.

16. The power conversion device according to claim 2, wherein
a converter group is further included so that the number of the converter groups is three or more,
each of the N DC-DC converters belongs to any of the three or more converter groups or stops operating, and
the control circuitry performs PWM switching control on the converter groups by using carriers having phases that differ from one another.

* * * * *